United States Patent Office 2,793,306
Patented May 21, 1957

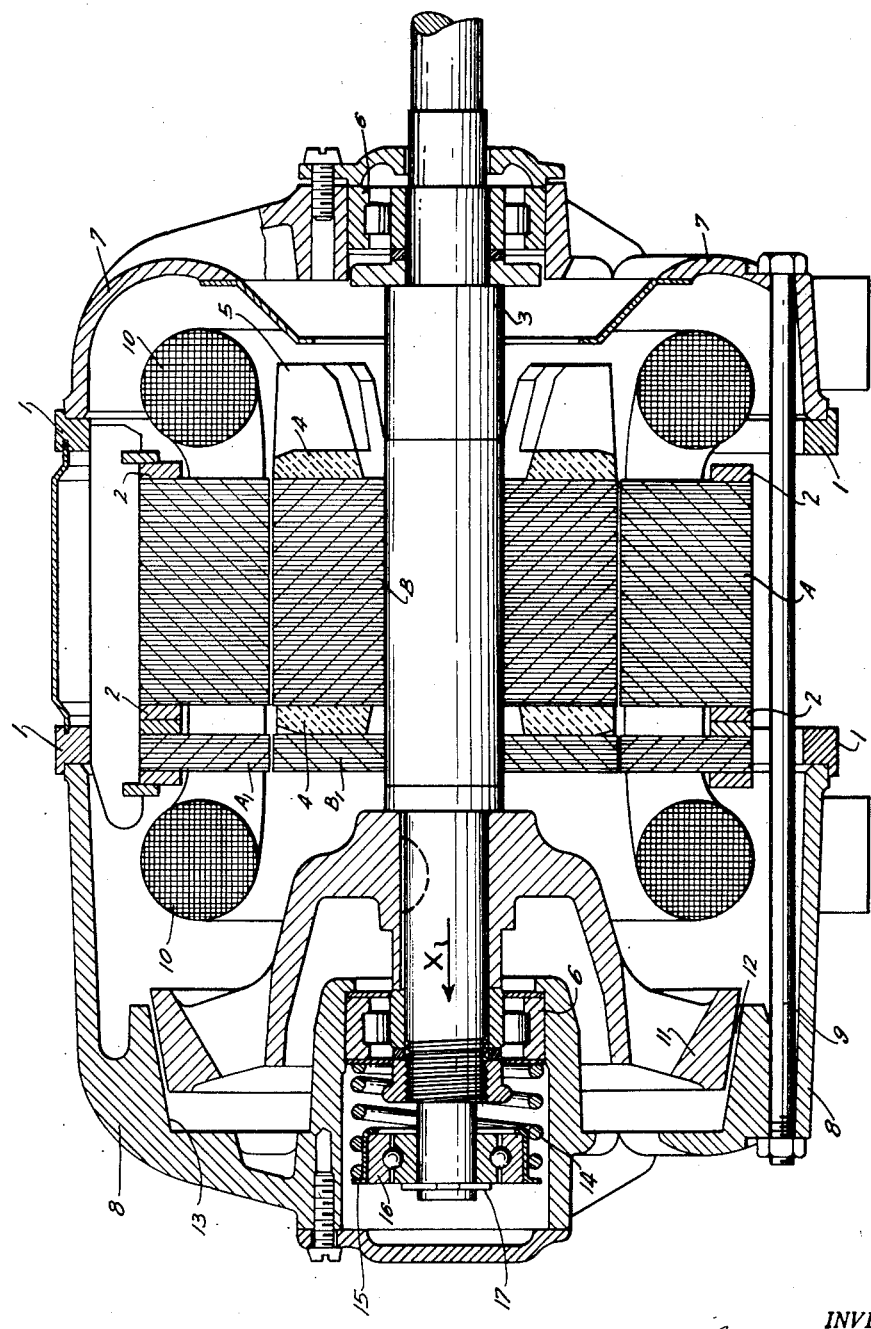

---

2,793,306

ELECTRIC MOTOR HAVING ITS ROTOR BRAKED WHEN ARRESTED

Enrico Bolech, Pavia, Italy

Application March 4, 1953, Serial No. 340,307

Claims priority, application Italy March 27, 1952

7 Claims. (Cl. 310—77)

The present invention is related to an electric motor having its rotor braked when arrested.

In numerous applications it is required that the driving electric motor be automatically braked as soon as the current is off. In this respect shoe brakes acting on a drum mounted on the motor shaft are known, operating as soon as the tension is off. However, frusto-conical rotor and stator magnetic core motors are preferred (usually called taper rotor motors) in which the rotor is subjected at the same time to a couple and to a certain axially directed force. This force is used to axially displace the rotor in contrast with a spring, so as to disengage two frictional (conical, for instance) elements, one of which is solid with the rotor and the other solid with the stator, with the result of unlocking the rotor and letting it to freely rotate.

The frusto-conical magnetic core motor presents some defects some of mechanical, others of an electrical nature. Among the first ones it is to be mentioned that the making of frusto-conical cores is onerous and laborious on account of the fact that all of the laminae of the cores are different from one another. It is further to be added that the axial displacement of the rotor causes a variation of the air gap; it is, consequently, necessary that the axial stopping point of the rotor (with the motor running) be perfectly adjusted inasmuch as this point determines the value of the minimum air gap, which is very important as concerns the working of the motor.

Amongst the disadvantages of an electrical nature there is the decrease of the attractive force at the start with the wearing out of the two friction elements. In fact, wear determines a displacement of the rotor in a direction increasing the air gap, which increase is negative as concerns the attractive force. Said force, on the other hand, is strongly limited at the start on account of the energetic dampening of the magnetic flux caused by the rotor cage, and consequently, the antagonistic load of the spring is to be limited, which load, substantially, determines the locking force.

The above mentioned inconveniences determine an increase of the frusto-conical armature and core sizes, with a consequent increase in materials cost; further, the inherent laboriousness of the construction and the delicacy of the set up increase the production cost, so that in the end they result, at parity of power and starting torque appreciably costlier than normal motors and their diffusion remains a limited one.

To these disadvantages obviates the electric motor according to the invention, characterized by the fact that it comprises, besides the usual elements of the common electric motor, at least one electro magnet fixed to one of the two parts (rotor or stator) having substantially radial pole pieces, and an anchor solidary to the other part.

The relative axial movement of the two parts results to be normal to the magnetic flux lines in the air gap and therefore an axial force is generated tending to center the anchor in respect to the pole pieces, said force being utilized for the unlocking of the motor in contrast with a locking spring means.

The invention is going to be described in reference to the annexed drawing, which description and drawing are given only by way of an indicative example, not limiting the range of the invention.

In said figure by A and B are respectively indicated the stator armature and rotor core. The former is fixed in a known way to the motor frame 1 by means of the side retaining rings 2. The rotor core B is keyed onto the driving shaft 3 and is provided wth a cast cage 4 of the known type with front cooling ribs 5. The motor shaft is supported by two radial straight roller bearings 6 whose inner race is not locked, and allows said shaft to axially displace itself in respect to the casing. The roller bearing housings are integral with two end shields 7 and 8 fixed to the motor frame 1 by means of bolts 9.

The rotor core B is of the cylindrical type (as, analogously is the axial bore in the stator core A) and is co-axial with the stator core; at a suitable distance from the latter there is fixed onto the driving shaft another pack of laminated sheets $B_1$, identical with those of the rotor, but in a lesser number, intended to constitute the anchor of the axial displacement electro magnet of the rotor. In correspondence with the auxiliary pack $B_1$, the stator carries a pack of sheets $A_1$, at a distance from the stator pack A, but made from the same sheets. The stator winding 10 of the motor besides embracing pack A, embraces the auxiliary pack $A_1$ as well, so as to realise an electro magnet coming into action when the stator winding is put under tension, i. e. when the motor is inserted.

On shaft 3 is keyed a drum 11 whose truncated-cone peripheral rim 12 is intended to collaborate with the truncated cone seat of end cover 8 to form the friction surfaces determining the locking of the rotor. The axial force determining the collaboration of the friction surfaces is exerted by a spiral spring 14 co-axial with shaft 3, pressing at one side against the outer roller bearing housing 6 and at the other end against a washer 15 axially bound to the outer race of a ball bearing 16. The inner race of said bearing is mounted on the end of shaft 3 and abuts against slit ring 17. Thus spring 14 tends to displace shaft 3 in the direction of arrow X determining the pressure over the conical friction surfaces locking rotor and stator to one another. Bearing 16, subjected to axial forces does nothing but consent the free rotation of the rotor, spring 14 remaining stationary. The reciprocal arrangement of laminated packs $A_1$ and $B_1$ is such that when the motor is under tension a force directed in an opposite direction to arrow X is exerted on discoidal anchor B which force tends to dispose laminated pack $B_1$, centered in respect to stator auxiliary pack $A_1$ (as illustrated in the figure). Said force opposes itself to spring 14, overcomes its action and unlocks the two friction surfaces 12 and 13 thus freeing the rotor. When the current to the motor and consequently to electro magnet $A_1$ is off, spring 14 again displaces the rotor according to arrow X locking said rotor against stationary end plate 8.

With a motor according to the invention, the following advantages are realized over the ordinary motors:

(a) The magnetic flux in the stator pack is not dampened, inasmuch as there is in the anchor $B_1$ no winding or squirrel cage as in the true and proper rotor pack B; therefore, at the instant when the winding is put under tension a powerful attractive force is realized, which force assures the separation of the two friction elements. As the rotor speed increases, said force decreases as the current absorbed by the winding diminishes, but, on the contrary, increasing the self centering force of rotor pack B in respect to stator pack A. The working of the braking system is safe and allows of predisposing a spring 14 largely sufficient to guarantee a quick and efficacious locking of the rotor by means of the frusto-conical friction surfaces 12 and 13.

(b) The setup of the motor is simple, as the relative axial position between stator and rotor does not create any air gap variations; it will be sufficient that in the locking position anchor $B_1$ be slightly displaced toward the friction surface 13 in respect to the core $A_1$ of the electro magnet.

(c) When the motor starts up an automatic axial self centering action is realized between stator and rotor, whose reciprocal position is defined by the equality of the axial actions opposed by spring 14 and by the electro magnet $A_1$.

(d) Starting and, therefore, the axial displacement of the rotor is realized without shocks inasmuch as no rigid stop means are provided, as the position of the motor when running is defined by a balance of forces as said at point c.

(e) The axial attractive force of electro magnet $A_1$ is a maximum at the start, i. e. when the transversal displacement of anchor $B_1$ in respect to pack $A_1$ is a maximum.

(f) The wear of surfaces 12 and 13 determines an increase of the transversal displacement of anchor $B_1$ in regard to core $A_1$, wherefore the attractive force does not appreciably vary with wear, on the contrary, it increases with it within certain limits.

(g) The construction of the motor is slightly more expensive of the normal asynchronous equal power motor, as the same active material as used for packs $B_1$ and $A_1$ can be used for packs B and A respectively.

(h) The running efficiency is in every respect comparable with that of a normal asynchronous motor.

It is understood, of course, that the constructional details of the locking device as well as the type of electric motor and stator (squirrel cage, wound or similar) may be varied without for this reason going out of the ambit of the invention and therefore of the realm of the present Letters Patent.

In particular, core $A_1$ and anchor $B_1$ also be realized with more than one sheet pack, separate from one another, so as to generate a total attractive force equal to the sum of the forces competing to each single couple.

I claim:
1. In an induction motor, in combination, an energizable stator means having a main stator portion and an additional stator portion; a rotor arranged adjacent said stator for rotation about its axis and being axially shiftable between running and shifted positions, said rotor having permanently the tendency to slide from said running into said shifted position; an induction-type armature forming part of said rotor and located opposite said main stator portion so that upon energization of said main stator portion a high starting torque is created in said induction-type armature while the force of attraction acting thereon is relatively small; and a magnetizable member having an outer surface substantially parallel to the axis of said rotor, said magnetizable member being magnetically independent of said induction-type armature mounted on said rotor and located opposite said additional stator portion out of alignment therewith in shifted position of said rotor and in alignment therewith in running position of said rotor, so that upon energization of said additional stator portion a high force of attraction acts on said magnetizable member resulting in sliding of said rotor from shifted into running position, while the torque created in said magnetizable member is relatively small.

2. In an induction motor, in combination, an energizable stator means having a main stator portion and an additional stator portion; a rotor arranged adjacent said stator for rotation about its axis and being axially shiftable between running and shifted positions; resilient means constantly urging said rotor from its running into its shifted position; an induction-type armature forming part of said rotor and located opposite said main stator portion so that upon energization of said main stator portion a high starting torque is created in said induction-type armature while the force of attraction acting thereon is relatively small; and a magnetizable member having an outer surface substantially parallel to the axis of said rotor, said magnetizable member being magnetically independent of said induction-type armature mounted on said rotor and located opposite said additional stator portion out of alignment therewith in shifted position of said rotor and in alignment therewith in running position of said rotor, so that upon energization of said additional stator portion a high force of attraction acts on said magnetizable member resulting in sliding of said rotor from shifted into running position, while the torque created in said magnetizable member is relatively small.

3. In an induction motor, in combination, an energizable stator means having a main stator portion and an additional stator portion spaced from each other; a rotor arranged adjacent said stator for rotation about its axis and being axially shiftable between running and shifted positions, said rotor having permanently the tendency to slide from said running into said shifted position; an induction-type armature forming part of said rotor and located opposite said main stator portion so that upon energization of said main stator portion a high starting torque is created in said induction-type armature while the force of attraction acting thereon is relatively small; and a cylindrical magnetizable member magnetically independent of said induction-type armature mounted on said rotor axially spaced from said induction-type armature and located opposite said additional stator portion out of alignment therewith in shifted position of said rotor and in alignment therewith in running position of said rotor, so that upon energization of said additional stator portion a high force of attraction acts on said magnetizable member resulting in sliding of said rotor from shifted into running position, while the torque created in said magnetizable member is relatively small.

4. In an induction motor, in combination, an energizable stator means having a main stator portion and an additional stator portion; a rotor arranged adjacent said stator for rotation about its axis and being axially shiftable between running and shifted positions; means constantly urging said rotor from its running into its shifted position; an induction-type armature forming part of said rotor and located opposite said main stator portion so that upon energization of said main stator portion a high starting torque is created in said induction-type armature while the force of attraction acting thereon is relatively small; a magnetizable member having an outer surface substantially parallel to the axis of said rotor, said magnetizable member being magnetically independent of said induction-type armature, mounted on said rotor and located opposite said additional stator portion out of alignment therewith in shifted positions of said rotor and in alignment therewith in running position of said rotor, so that upon energization of said additional stator portion a high force of attraction acts on said magnetizable member resulting in sliding of said rotor from shifted into running position, while the torque created in said magnetizable member is relatively small; a winding associated with said stator means for energizing both said main stator portion and said additional stator portion; and brake means operable by said rotor when the same is moved into its shifted position.

5. In an induction motor, in combination, an energizable stator means having a main stator portion and an additional stator portion spaced from each other; a rotor arranged adjacent said stator for rotation about its axis and being axially shiftable between running and shifted positions; means constantly urging said rotor from its running into its shifted position; an induction-type armature having a squirrel cage associated therewith and forming part of said rotor and located opposite said main stator portion so that upon energization of said main stator portion a high starting torque is created in said induction-type armature while the force of attraction acting thereon is relatively small; a magnetizable member having an outer surface substantially parallel to the axis of said rotor, said magnetizable member being magnetically independent of said induction-type armature and said squirrel cage thereof mounted on said rotor axially spaced from said induction-type armature and located opposite said additional stator portion out of alignment therewith in shifted position of said rotor and in alignment therewith in running position of said rotor, so that upon energization of said additional stator portion a high force of attraction acts on said magnetizable member resulting in sliding of said rotor from shifted into running position, while the torque created in said magnetizable member is relatively small; a winding associated with said stator means for energizing both said main stator portion and said additional stator portion; and brake means operable by said rotor when the same is moved into its shifted position.

6. In an induction motor, in combination, housing means having an annular surface portion; an energizable stator means in said housing means and having a main stator portion and an additional stator portion; a rotor including a shaft arranged in said housing means and adjacent said stator for rotation about its axis and being axially shiftable between running and shifted positions; brake means mounted on said shaft of said rotor for movement therewith and having an annular engaging surface complementary to said annular surface portion of said housing means and engageable therewith in shifted position of said rotor for braking the same; means constantly urging said rotor from its running into its shifted position; an induction-type armature forming part of said rotor and located opposite said main stator portion so that upon energization of said main stator portion a high starting torque is created in said induction-type armature while the force of attraction acting thereon is relatively small; a magnetizable member having an outer surface substantially parallel to the axis of said rotor, said magnetizable member being magnetically independent of said induction-type armature mounted on said rotor and located opposite said additional stator portion out of alignment therewith in shifted position of said rotor and in alignment therewith in running position of said rotor, so that upon energization of said additional stator portion a high force of attraction acts on said magnetizable member resulting in sliding of said rotor from shifted into running position, while the torque created in said magnetizable member is relatively small; and a winding associated with said stator means for energizing both said main stator portion and said additional stator portion.

7. In an induction motor, in combination, an energizable stator means having a main stator portion and an additional stator portion composed of a plurality of laminated sheets; a rotor arranged adjacent said stator for rotation about its axis and being axially shiftable between running and shifted positions, said rotor having permanently the tendency to slide from said running into said shifted position; an induction-type armature forming part of said rotor and located opposite said main stator portion so that upon energization of said main stator portion a high starting torque is created in said induction-type armature while the force of attraction acting thereon is relatively small; and a magnetizable member having an outer surface substantially parallel to the axis of said rotor, said magnetizable member being composed of a plurality of laminated sheets magnetically independent of said induction-type armature mounted on said rotor and located opposite said additional stator portion out of alignment therewith in shifted position of said rotor and in alignment therewith in running position of said rotor, so that upon energization of said additional stator portion a high force of attraction acts on said magnetizable member resulting in sliding of said rotor from shifted into running position, while the torque created in said magnetizable member is relatively small.

References Cited in the file of this patent
UNITED STATES PATENTS

| 2,480,291 | Gerentes | Aug. 30, 1949 |
| 2,536,491 | Chapman et al. | Jan. 2, 1951 |

FOREIGN PATENTS

| 165,594 | Austria | Mar. 25, 1950 |
| 607,673 | Germany | Jan. 4, 1935 |